US012216295B2

(12) United States Patent
Smolka et al.

(10) Patent No.: US 12,216,295 B2
(45) Date of Patent: Feb. 4, 2025

(54) COMPACT LIQUID LENS HAVING AN ADJUSTABLE FOCAL LENGTH

(71) Applicant: OPTOTUNE AG, Dietikon (CH)

(72) Inventors: Stephan Smolka, Zürich (CH); Manuel Aschwanden, Allenwinden (CH); Chris Laning, Windisch (CH); Roman Patscheider, Winterthur (CH); Johannes Haase, Dietikon (CH); David Andreas Niederer, Küttigen (CH)

( * ) Notice: Subject to any disclaimer, the term of this patent is extended or adjusted under 35 U.S.C. 154(b) by 278 days.

(21) Appl. No.: 17/298,621

(22) PCT Filed: Nov. 29, 2019

(86) PCT No.: PCT/EP2019/083183
§ 371 (c)(1),
(2) Date: May 31, 2021

(87) PCT Pub. No.: WO2020/109605
PCT Pub. Date: Jun. 4, 2020

(65) Prior Publication Data
US 2022/0011473 A1    Jan. 13, 2022

(30) Foreign Application Priority Data
Nov. 29, 2018   (EP) ..................... 18209306

(51) Int. Cl.
*G02B 1/06*   (2006.01)
*G02B 3/12*   (2006.01)
(Continued)

(52) U.S. Cl.
CPC .............. *G02B 3/14* (2013.01); *G02B 7/04* (2013.01); *G02B 26/004* (2013.01); *G03B 2205/0069* (2013.01); *G03B 2205/0076* (2013.01)

(58) Field of Classification Search
CPC .......... G02B 3/14; G02B 7/04; G02B 26/004; G03B 2205/0069; G03B 2205/0076
(Continued)

(56) References Cited

U.S. PATENT DOCUMENTS

2007/0030573 A1 *   2/2007   Batchko ................. B33Y 30/00
                                                          359/665
2010/0202054 A1     8/2010   Niederer
(Continued)

FOREIGN PATENT DOCUMENTS

CN     101796436 A     8/2010
CN     102422185 A     4/2012
(Continued)

*Primary Examiner* — Mahidere S Sahle
(74) *Attorney, Agent, or Firm* — JMB Davis Ben-David (57) ABSTRACT

The invention relates to a lens (1) having an adjustable focal length, comprising: a container (2) enclosing an internal space (3) of the container (2), wherein the internal space (3) is filled with a transparent liquid (L), and wherein the container (2) comprises a circumferential lateral wall (20) surrounding said internal space (3), wherein the lateral wall (20) is connected to a transparent cover element (21) and to a transparent and elastically deformable membrane (22) such that the liquid (L) is arranged between the membrane (22) and the cover element (21), an annular lens shaper (4) connected to the membrane (22) so that an inner circumferential edge (40) of the lens shaper (4) defines a central area (23) of the membrane (22) and light passing said area (23) is refracted depending on a curvature of said area (23), and an actuator configured to move the lens shaper (4) towards or away from the cover element (21) to adjust said curvature of said area (23) of the lens (1) and therewith the focal length of the lens (1), wherein for moving the lens shaper (4), the actuator comprises a coil (6) integrated into the lateral wall (20), wherein the actuator is configured to generate an
(Continued)

electrical current in the coil (6) so that the coil (6) generates a magnetic field to move the lens shaper (4).

8 Claims, 4 Drawing Sheets

(51) Int. Cl.
  *G02B 3/14* (2006.01)
  *G02B 7/04* (2021.01)
  *G02B 26/00* (2006.01)
(58) Field of Classification Search
  USPC ................ 359/665–667, 694–706, 822–824
  See application file for complete search history.

(56) References Cited

U.S. PATENT DOCUMENTS

| | | |
|---|---|---|
| 2010/0208357 A1 | 8/2010 | Batchko |
| 2010/0232161 A1 | 9/2010 | Aschwanden et al. |
| 2013/0176628 A1* | 7/2013 | Batchko .................. G02B 3/12 359/665 |
| 2013/0222685 A1 | 8/2013 | Topliss |
| 2019/0230262 A1* | 7/2019 | Wang ....................... G02B 7/08 |

FOREIGN PATENT DOCUMENTS

| | | |
|---|---|---|
| CN | 102947730 | 2/2013 |
| CN | 104508541 | 4/2015 |
| CN | 109073791 A | 12/2018 |
| JP | 1999133210 | 5/1999 |
| JP | 2011017946 | 1/2011 |
| JP | 2011112757 | 6/2011 |
| JP | 2011175160 | 9/2011 |
| KR | 20130020263 | 2/2013 |
| WO | 2009123606 | 10/2009 |
| WO | 2009123606 A1 | 10/2009 |
| WO | 2017149092 | 9/2017 |
| WO | 2017149092 A2 | 9/2017 |
| WO | 2018057986 | 3/2018 |
| WO | 2018204888 | 11/2018 |

* cited by examiner

Fig. 4

COMPACT LIQUID LENS HAVING AN ADJUSTABLE FOCAL LENGTH

CROSS-REFERENCE TO RELATED APPLICATIONS

This is the U.S. National Stage of International Patent Application No. PCT/EP2019/083183 filed on Nov. 29, 2019, which in turn claims the benefit of European Patent Application No. 18209306.2 filed on Nov. 29, 2018.

The present invention relates to a lens having an adjustable focal length.

Lenses having an adjustable focal length are used in a broad variety of technical applications. Particularly regarding mobile application, such as smart phones and other small hand-held devices it is of great importance that the respective lens requires an installation space that is as small as possible.

Therefore, it is an objective of the present invention to provide a lens that has a focal length that can be altered and that comprises a compact design that allows to minimize the installation space of the lens.

This problem is solved by a lens having the features of claim 1.

Preferred embodiments of these aspects of the present invention are stated in the corresponding sub claims and are also described below.

According to claim 1 a lens having a variable focal length is disclosed, comprising:

a container enclosing an internal space of the container, wherein the internal space is filled with a transparent liquid, and wherein the container comprises a circumferential lateral wall surrounding said internal space, wherein the lateral wall is connected to a transparent rigid cover element forming a bottom of the container and to a transparent and elastically deformable membrane such that the liquid is arranged between the membrane and the cover element, an annular lens shaper connected to the membrane so that an inner circumferential edge of the lens shaper defines a central area of the membrane and light passing said area is refracted depending on a curvature of said area, and an actuator configured to move the lens shaper towards or away from the cover element to adjust said curvature of said area of the lens and therewith the focal length of the lens, wherein for moving the lens shaper, the actuator comprises a coil integrated into the lateral wall so that particularly the coil surrounds the internal space and the liquid therein, wherein the actuator is configured to generate an electrical current in the coil so that the coil generates a magnetic field to move the lens shaper.

According to an embodiment of the present invention, the membrane is connected to the lateral wall via an annular spacer arranged between the lateral wall and the membrane.

Preferably, according to an embodiment, the annular spacer comprises an inner diameter that is larger than an inner diameter of the circumferential lateral wall.

Furthermore, according to an embodiment of the present invention, the spacer is a plating (e.g. a metal plating) plated onto a face side of the lateral wall.

Preferably, the spacer comprises or is formed out of one of the following materials: a metal, a non-magnetic material, a non-magnetic metal, copper, an alloy comprising copper. Particularly, copper has the advantage that it can be applied onto a PCB in a simple manner. Furthermore, the metal or material of the spacer is preferably non-magnetic so that it does not shield a magnetic circuit between the lens shaper and a coil. However, the spacer may also be formed out of or comprise a plastic material (e.g. a polymer), or a glass. Particularly, the spacer may be formed out of a material that exhibits a thermal expansion that helps to compensate a volume expansion of the liquid (with increasing temperature) so that the spacer may also help in achieving passive temperature compensation of the lens.

Instead of a plating the spacer can also be a separate annular spacer that is mounted (e.g. glued) to the lateral wall, or a member integrally formed with the lateral wall.

Furthermore, according to an embodiment of the present invention, the lateral wall is formed by a printed circuit board, wherein said coil is formed by a conductor embedded into the printed circuit board.

Furthermore, according to an alternative embodiment of the present invention, the coil is formed by a discrete part encapsulated in the lateral wall.

Furthermore, according to an embodiment of the present invention, the lens shaper comprises an annular permanent magnet or is formed by an annular permanent magnet.

Furthermore, according to an embodiment of the present invention, the lens shaper is arranged in the internal space of the container and immersed in the liquid. Particularly, the lens shaper (e.g. permanent magnet) is connected to a bottom side of the membrane, which bottom side faces the cover element. Particularly, placing the lens shaper inside the liquid allows to reduce the height of the lens in the direction of the optical axis of the lens. Further, in conjunction with the spacer, a reduction of the diameter of the lens can be achieved. This is due to the fact that the spacer allows achieving a free membrane portion outside the clear aperture and particularly above the coil. Having a free membrane length above the coil also allows to maximize the clear aperture (with the same coil size), relative to the outer diameter of the container.

Furthermore, according to an embodiment of the present invention, the permanent magnet is radially magnetized so that the magnetization is oriented in a radial direction of the lens shaper.

Furthermore, according to an embodiment of the present invention, the magnet comprises a circumferential outer side facing an inner side of the lateral wall in the direction of the magnetization of the permanent magnet (or in the radial direction of the lens shaper).

Furthermore, according to an embodiment of the present invention, the lens shaper is arranged outside the internal space of the container, wherein particularly the lens shaper is connected to a top side of the membrane, which top side faces away from the cover element. Also this configuration allows minimizing the outer diameter of the lens, particularly in combination with the spacer. Also here, a portion of the membrane above the coil of the actuator contributes to a free membrane length that can be used to deflect the membrane with a relatively low force.

Furthermore, according to an embodiment of the present invention, the permanent magnet is axially magnetized so that the magnetization is particularly oriented in the direction of an optical axis of the lens.

Furthermore, according to an embodiment of the present invention, the lens shaper comprises a layer, wherein the layer is connected to the top side of the membrane and arranged between the top side of the membrane and the permanent magnet. Particularly, the layer is formed out of a non-magnetic material. The material can be one of: a metal, a plastic material, a glass, silicon.

Furthermore, according to an embodiment of the present invention, an interaction of the current-carrying coil with a magnetic field of the permanent magnet corresponds to a Lorentz force.

Furthermore, according to an embodiment of the present invention, the lens shaper is formed by an annular member formed out of a magnetically soft metal or wherein the lens shaper comprises an annular member formed out of a magnetically soft metal. Particularly, the magnetically soft metal is one of: a ferromagnetic metal, an alloy comprising iron and nickel. Particularly, a magnetically soft metal according to the present invention comprises a relative permeability that is larger than one.

Furthermore, according to an embodiment of the present invention, the annular member forms an air gap with the spacer.

Furthermore, particularly in case the actuator is configured to generate a reluctance force for moving the lens shaper (see also below), the spacer is preferably formed out of a non-magnetic material.

Particularly, the lens shaper is formed by a circular protrusion of the annular member that is connected to the top side of the membrane and forms said inner edge of the lens shaper.

Furthermore, according to an embodiment of the present invention, the magnetic field of the coil generates a reluctance force that moves the annular member (and thus the lens shaper) towards the spacer to minimize the air gap.

According to a further aspect of the present invention, a lens having an adjustable focal length is disclosed, the lens comprising:

- a container enclosing an internal space of the container, wherein the internal space is filled with a transparent liquid, and wherein the container comprises a circumferential lateral wall surrounding said internal space, wherein the lateral wall is connected to a transparent rigid cover element forming a bottom of the container and to a transparent and elastically deformable membrane such that the liquid is arranged between the membrane and the cover element,
- an annular lens shaper connected to the membrane so that an inner circumferential edge of the lens shaper defines a central area of the membrane and light passing said area is refracted depending on a curvature of said area, and
- an actuator configured to move the lens shaper towards the cover element to adjust said curvature of said area of the lens and therewith the focal length of the lens, wherein for moving the lens shaper, the actuator comprises at least one deformable member formed out of a shape-memory alloy, wherein said deformable member comprises a first state corresponding to an initial position of the lens shaper and a second state in which the lens shaper is moved towards the cover element to adjust the focal length of the lens.

Furthermore, according to an embodiment of the present invention, the actuator is configured to heat the deformable member to bring the deformable member from the first state to the second state. Particularly, the actuator is configured to heat the deformable member by generating a current in the deformable member that is formed out of the shape-memory alloy. Particularly, the actuator can be configured to heat the deformable member by way of induction heating using e.g. a coil, wherein the actuator is configured to generate an alternating current in this coil so that an eddy current is generated in the deformable member to heat the deformable member (Joule heating).

Particularly, according to an embodiment, the lateral wall comprises a thermally insulating portion forming an inside of the lateral wall, which inside faces the internal space of the container. The thermally insulating portion (e.g. layer) can be formed out of a plastic material (e.g. PCB FR4 material, e.g. a glass-reinforced epoxy laminate material).

Furthermore, according to an embodiment, the lateral wall comprises a portion (e.g. layer) forming an outside of the lateral wall, which portion can be formed out of a metal (e.g. copper or an alloy comprising copper), particularly to ensure good heat conduction to the outside and minimise heating of the liquid (e.g. due to the coil of the actuator or a component of the lens generating heat). Particularly, these portions of the lateral wall can be provided in all embodiments/aspects of the present invention.

Furthermore, according to an embodiment of the present invention, the deformable member is arranged outside the internal space of the container.

Furthermore, according to an embodiment of the present invention, the deformable member comprises an elongated shape.

Furthermore, according to an embodiment of the present invention, the deformable member forms a loop, particularly a closed loop.

Furthermore, according to an embodiment of the present invention, the deformable member is connected to holding elements arranged on an outside of the lateral wall.

Furthermore, according to an embodiment of the present invention, the lens shaper comprises four protrusions extending in a radial direction of the lens shaper.

Furthermore, according to an embodiment of the present invention, the deformable member comprises four portions, wherein each portion extends over one of the protrusions. Thus, particularly, the lens shaper is coupled via the deformable member to the container of the lens.

Furthermore, according to an embodiment of the present invention, in the second state of the deformable member, each portion comprises a reduced curvature compared to the first state of the deformable member, so that the lens shaper is pulled towards the cover element when the deformable member is brought from the first state to the second state due to the fact that said portions extend over the protrusions of the lens shaper and the deformable member is connected to the container via the holding elements.

Furthermore, according to an embodiment of the present invention, the membrane is connected to the lateral wall via an annular spacer arranged between the lateral wall and the membrane, wherein the annular spacer preferably comprises an inner diameter that is larger than an inner diameter of the circumferential lateral wall.

Furthermore, according to an embodiment of the present invention, the at least one deformable member and the lens shaper are arranged in the internal space of the container and are immersed in the liquid.

Furthermore, according to an embodiment of the present invention, the lateral wall is formed as a printed circuit board.

The lens designs disclosed herein allow reducing the size of the respective lens for miniaturized applications, such as mobile phone cameras, surgery, endoscopy machine vision, bar code scanning, surveillance cameras, IOT devices, and drones.

In the following, further advantages, features as well as embodiments of the present invention are described with reference to the Figures, wherein:

FIG. 1 shows a schematical cross-sectional view (A) of an embodiment of a lens according to the present invention, wherein (B) shows a schematical top view of the embodiment;

FIG. 2 shows a schematical cross-sectional view (A) of a further embodiment of a lens according to the present invention, wherein (B) shows a schematical top view of this embodiment;

FIG. 4 shows a perspective view (A) and a schematical cross sectional view of a further embodiment of a lens according to the present invention, while (C) shows a schematical cross-sectional view of a modification of the embodiment shown in (A) and (B).

Figure 1:
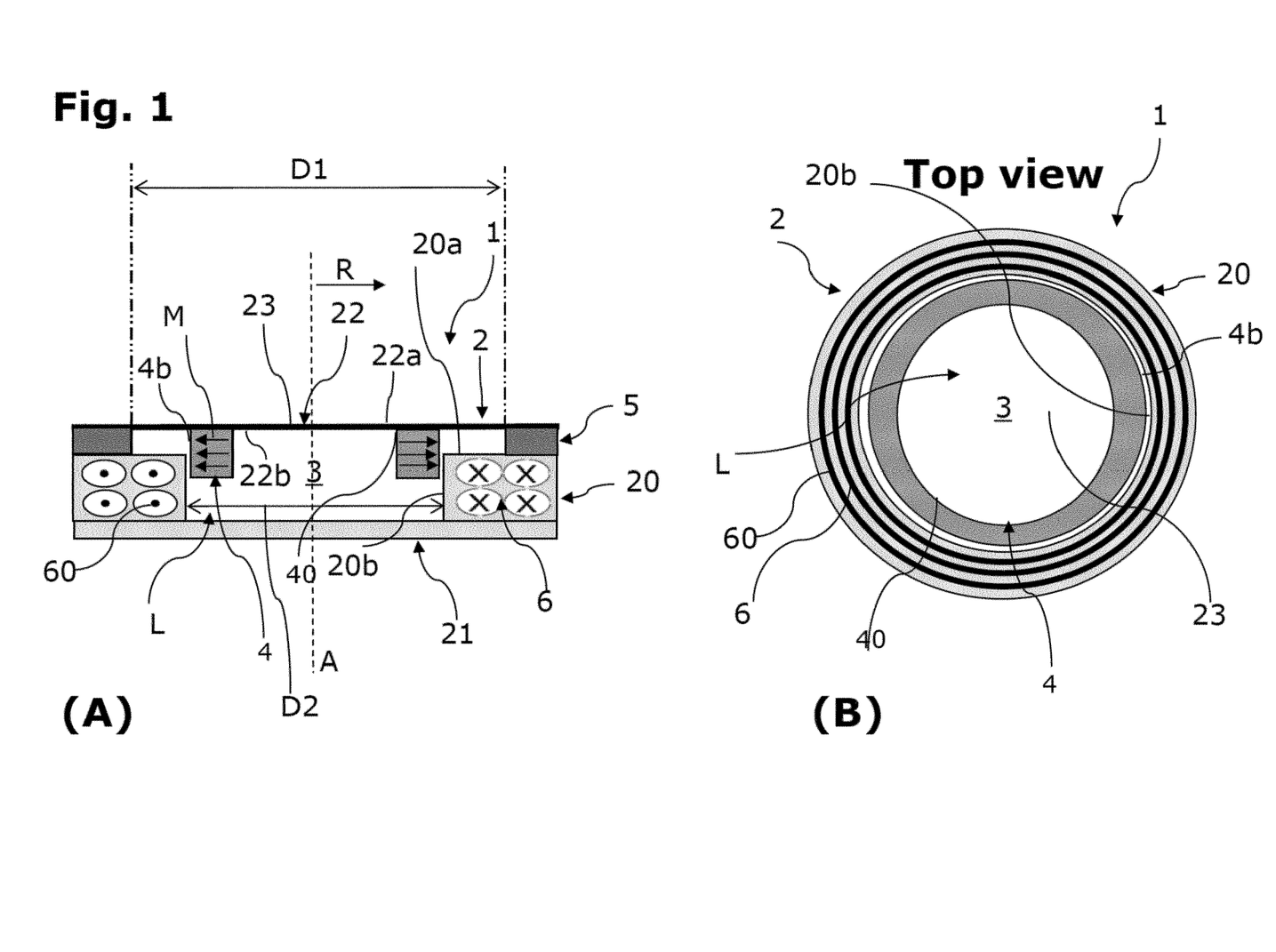

FIGS. 1(A) and 1(B) show a lens 1 according to the present invention, wherein the lens 1 comprises an adjustable focal length. For this, the lens 1 comprises a container 2 enclosing an internal space 3 of the container 2, wherein the internal space 3 is filled with a transparent liquid L, and wherein the container 2 comprises a circumferential lateral wall 20 surrounding said internal space 3, wherein the lateral wall 20 is connected to a transparent cover element 21 (formed e.g. out of a glass or a plastic material or polymer) and to a transparent and elastically deformable membrane 22 that the liquid L is arranged between the membrane 22 and the cover element 21. Particularly, the container 2 forms a hermetically sealed receptacle for the liquid L that is transparent in the direction of the optical axis A. Furthermore, the lens 1 comprises an annular lens shaper 4 connected to the membrane 22 so that an inner circumferential (e.g. circular) edge 40 of the lens shaper 4 defines a central area 23 of the membrane 22 (corresponding e.g. to a clear aperture of the lens 1) and light passing said area 23 is refracted depending on a curvature of said area 23. Furthermore, the lens 1 comprises an actuator that is configured to move the lens shaper 4 towards or away from the cover element 21 along the optical axis A to adjust/change said curvature of said area 23 of the lens 1 and therewith the focal length of the lens 1. For instance, in FIG. 1(A) the area 23 is flat, but will form a convex bulge due to the liquid L in the internal space 3 when the lens shaper 4 is moved downwards (towards cover element 21) so that the focal length of the lens 1 will decrease. Particularly, for moving the lens shaper 4, the actuator comprises a coil 6 integrated into the lateral wall 20, wherein the actuator is configured to generate an electrical current in the coil 6 so that the coil 6 generates a magnetic field to move the lens shaper 4. Particularly, the coil 6 comprises an electrical conductor 60 that extends around a virtual coil axis that preferably coincides with the optical axis A of the lens 1.

As can be seen from FIG. 1(A), the membrane 22 is preferably connected to the lateral wall 20 via an annular spacer 5 arranged between the lateral wall 20 and the membrane 22. Particularly, the spacer 5 can be connected (e.g. glued) to a face side 20a of the lateral wall 20, which face side 20a faces away from the cover element 21 that is preferably rigid compared to the elastically deformable membrane 22.

Furthermore, particularly, the annular spacer 5 comprises an inner diameter D1 that is larger than an inner diameter D2 of the circumferential lateral wall 20, so that an inner side formed by the lateral wall 20 and the spacer 5 forms a circumferential step.

According to FIG. 1(A), the spacer 5 can be an annular member 5 formed out of a metal. Preferably, the metal is one of: a non-magnetic metal, copper, an alloy comprising copper.

According to an embodiment, the lateral wall 20 is formed by a printed circuit board, wherein said coil 6 is formed by a conductor 60 of said PCB, i.e. the conductor 60/coil 6 is embedded into the printed circuit board and forms an integral part of the PCB. According to an alternative embodiment, the coil 6 can be a discrete part (i.e. a wound coil) that is encapsulated in the lateral wall 20.

Furthermore, for moving the lens shaper 4 using the coil 6 based on a voice coil motor principle, the lens shaper 4 comprises an annular permanent magnet. Here particularly, the lens shaper is formed by the permanent annular magnet 4.

As can be seen from FIG. 1(A), the lens shaper 4 is preferably arranged in the internal space 3 of the container 2 and immersed in the liquid L. This allows for a very compact design of the lens 1. Particularly, the lens shaper/permanent magnet 4 is connected to a bottom side 22b of the membrane 22, which bottom side 22b faces the cover element 21.

Particularly, the permanent magnet 4 is radially magnetized so that the respective magnetization M is oriented in a radial direction R of the lens shaper 4, which radial direction R is perpendicular to the optical axis A and points outwards.

Due to the arrangement of the magnet/lens shaper 4 in the internal space 3 of the container 2, a circumferential outer side 4b of the magnet 4 faces an inner side 20b of the lateral wall 20 in the radial direction R/direction of the magnetization M of the permanent magnet 4.

Figure 2:
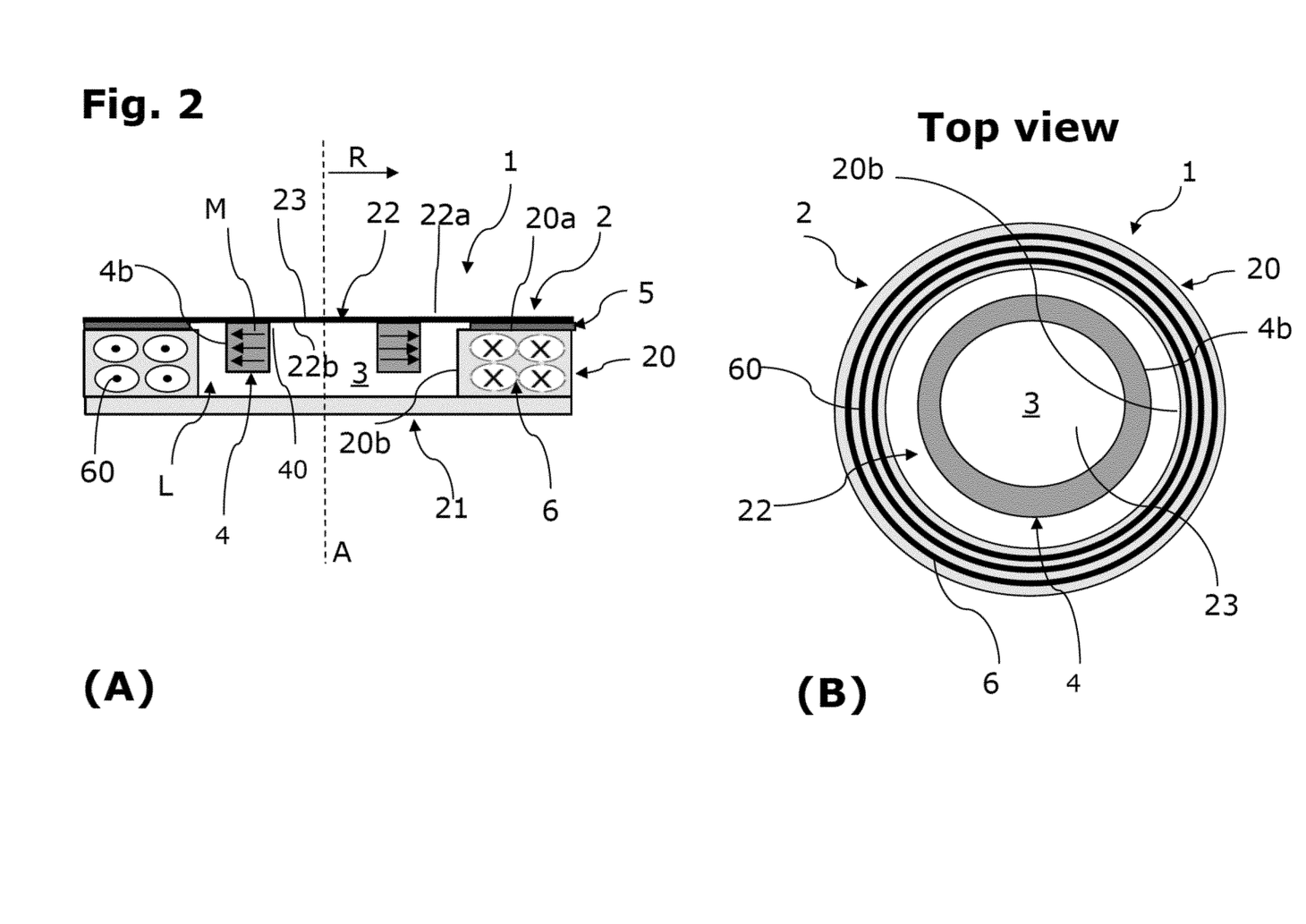

As shown in FIG. 2(A), the height of the lens 1 in the direction of the optical axis A can be further reduced in case the spacer 5 is omitted or substituted by a thinner spacer 5 which according to FIG. 2(A) can be formed by a metal plating plated onto the face side 20a of the lateral wall 20. Preferably, the metal of the metal plating is one of: a non-magnetic metal, copper, an alloy comprising copper.

In the embodiments shown in FIGS. 1(A) and 2(A), the magnet 4 is immersed in the liquid L. Here particularly, the spacer 5 can also be formed out of a magnetically soft metal, (i.e. a ferromagnetic metal or an alloy comprising e.g. iron and nickel).

Figure 3:
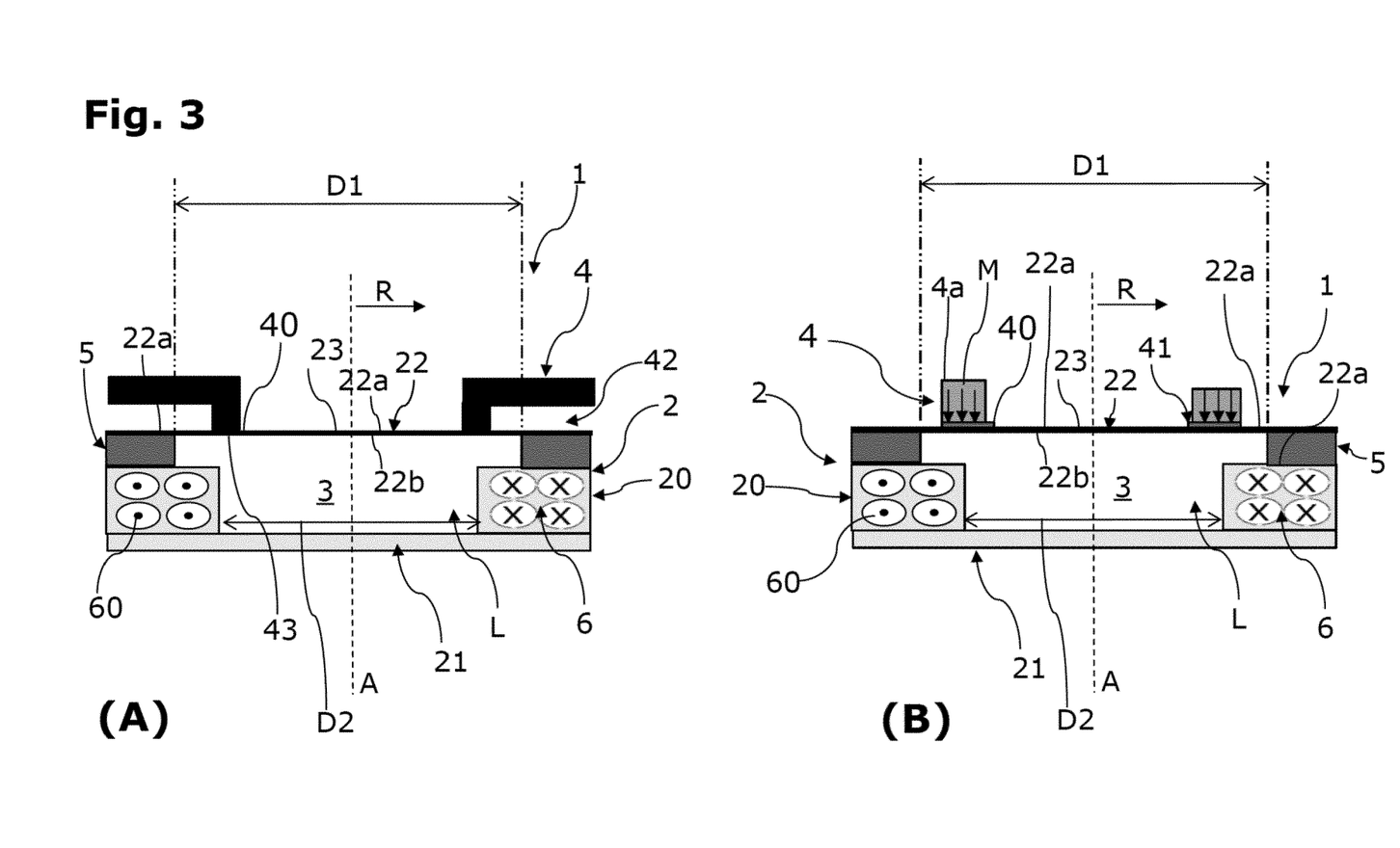
FIG. 3 shows schematical cross-sectional views of further embodiments (A) and (B) of a lens according to the present invention.

According to alternative embodiments shown in FIGS. 3(A) and (B), the lens shaper 4 can also be arranged outside the internal space 3 of the container 2 of the lens 1.

Particularly, FIG. 3(A) shows a modification of the embodiment shown in FIG. 1(A), wherein in FIG. 3(A), in contrast to FIG. 1(A), the actuator is a reluctance actuator and the magnet 4 is therefore replaced by an annular member 4 that is formed out of a metal, particularly a magnetically soft metal (i.e. a ferromagnetic metal or an alloy comprising e.g. iron and nickel.

However, the spacer 5 arranged on the face side 20a of the lateral wall 20 as before, is preferably formed out of a non-magnetic metal/material and is separated by an air gap 42 from the annular member 4, such that the magnetic field generated by the coil 6 of the actuator generates a reluctance force that moves the annular member 4 (i.e. the lens shaper 4) towards the spacer 5 to minimize the air gap 42. This changes the curvature of the area 23 of the membrane 22 and therewith the focal length of the lens 1 accordingly.

Particularly, as shown in FIG. 3(A), the annular member 4 can comprise a circular protrusion 43 that is connected to the top side 22a of the membrane 22 and forms said inner edge 40 of the lens shaper 4.

FIG. 3(B) shows a modification of the embodiment shown in FIG. 3(B) which utilizes a voice-coil actuator to deform the area 23 of the membrane 22. Here, the annular member 4 of FIG. 3(A) is replaced by an annular permanent magnet 4a that forms the lens shaper 4 together with a layer 41 formed e.g. out of a metal, wherein said layer 41 is connected to the top side 22a of the membrane 22 and arranged between the top side 22a of the membrane 22 and the permanent magnet 4a of the lens shaper 4 so that said metallic layer 41 forms the circular edge 40 of the lens shaper 4. Particularly, in contrast to FIGS. 1 and 2, the magnet 4 is now axially magnetized so that the magnetization M is oriented in the direction of the optical axis A of the lens 1.

So far, the embodiments described have utilized a dipole-dipole or Lorentz interaction (voice coil) for moving the respective lens shaper 4 or a reluctance motor (FIG. 3(A)). However, also shape-memory alloys can be used according to embodiments of the present invention in order to move the lens shaper 4 and to therewith adjust/change the focal length of the lens 1.

Figure 4:
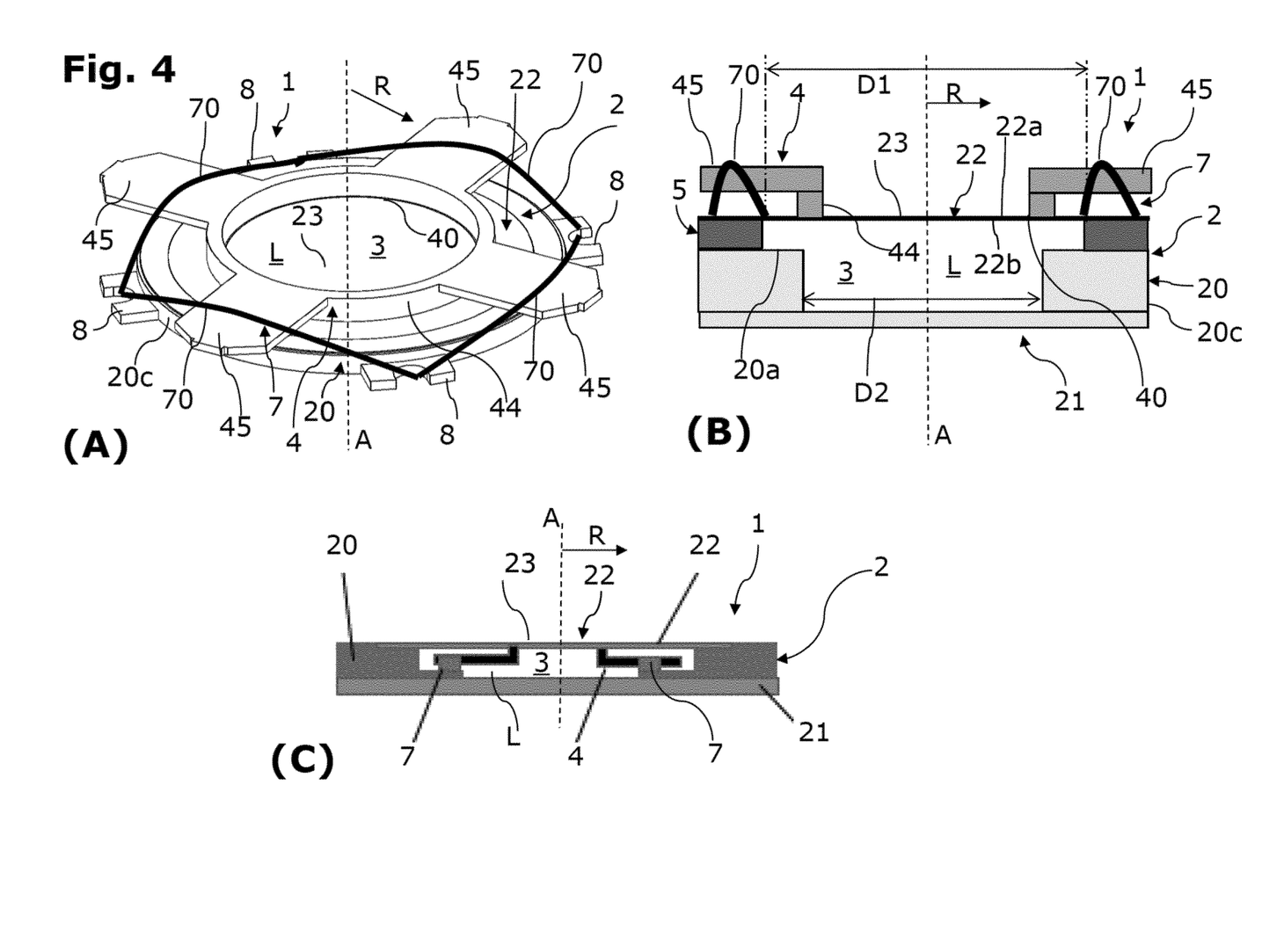

As shown for instance in FIGS. 4(A) and (B), such a lens 1 comprises again a container 2 enclosing an internal space 3 of the container 2, wherein the internal space 3 is filled with a transparent liquid L, and wherein the container 2 comprises a circumferential lateral wall 20 surrounding said internal space 3, wherein the lateral wall 20 is connected to a transparent cover element 21 forming a bottom of the container 2 and to a transparent and elastically deformable membrane 22 such that the liquid L is arranged between the membrane 22 and the cover element 21. Furthermore, the lens 1 also comprises an annular lens shaper 4 connected to the membrane 22 so that an inner circumferential edge 40 of the lens shaper 4 defines a central area 23 of the lens 1 and light passing said area 23 is refracted depending on a curvature of said area 23. Furthermore, the lens 1 comprises an actuator configured to move the lens shaper 4 towards the cover element 21 to adjust/change said curvature of said area 23 of the membrane 22 and therewith the focal length of the lens 1, wherein for moving the lens shaper 4, the actuator comprises at least one deformable member 7 formed out of a shape-memory alloy. Particularly, said deformable member 7 comprises a first state corresponding to an initial position of the lens shaper 4 and a second state in which the lens shaper 4 is moved towards the cover element 21 to adjust the focal length of the lens 1.

Particularly, the actuator is configured to heat the at least one deformable member 7 to bring the at least one deformable member 7 from the first state to the second state. For this, the actuator can be configured to heat the at least one deformable member 7 by generating a current in the deformable member 7 to generate Joule heat (direct electrical heating).

According to the variant shown in FIGS. 4(A) and (B), the at least one deformable member 7 can be arranged outside the internal space 3 of the container 2. And may comprise an elongated shape and form a loop 7. Particularly, the deformable shape-memory alloy member 7 can be connected to the container 2 through holding elements 8 protruding from an outside 20c of the lateral wall 20. On the other side, the deformable member 7 comprises portions 70 that are laid over protrusions 45 of the lens shaper 4, which protrusions 45 protrude from an annular base portion 44 of the lens shaper 4 that is connected to the top side 22a of the membrane 22 and forms said circumferential edge 40 of the lens shaper 4 which defines the curvature-adjustable central area (aperture) 23 of the lens 1.

As indicated in FIG. 4(A), in the first state of the at least one deformable member 7, each portion 70 comprises a defined curvature and the lens shaper is in an initial position also shown in FIG. 4(B). However, this curvature is reduced when the deformable member 7 is converted to its second state by heating the latter. In the second state the portions 70 are more straight compared to the first state and thus press the lens shaper 4 downwards (i.e. towards the cover element 21). This changes the curvature of the area 23 and therewith the focal length of the lens 1. Particularly, this movement of the lens shaper 11 may generate a convex bulge of the area 23 of the membrane 22 due to the liquid L in the internal space 3 so that the focal length of the lens 1 decreases.

Also here, as shown in FIG. 4(B), the membrane 22 can be connected to the lateral wall 20 via an annular spacer 5 arranged between the lateral wall 20 (e.g. face side 20a) and the membrane 22. Particularly, the annular spacer 5 can comprise an inner diameter D1 that is larger than an inner diameter D2 of the circumferential lateral wall 20.

FIG. 4(C) shows a modification of the embodiment shown in FIGS. 4(A) and (B), wherein in contrast to FIGS. 4(A) and (B), the at least one deformable member 7 formed out of a shape-memory alloy and the lens shaper 4 are arranged in the internal space 3 of the container 2 and are immersed in the liquid L to further reduce the height of the lens 1 in the direction of the optical axis A. Also here, the lateral wall 20 can be formed as a printed circuit board so that particularly electrical components of the lens 1 for driving the deformable member 7 can be integrated into the lateral wall 20 of the lens 1.

The invention claimed is:

1. A lens having an adjustable focal length, comprising:
   a container enclosing an internal space of the container, wherein the internal space is filled with a transparent liquid, and wherein the container comprises a circumferential lateral wall surrounding said internal space, wherein the lateral wall is connected to a transparent cover element and to a transparent and elastically deformable membrane such that the liquid is arranged between the membrane and the cover element,
   an annular lens shaper connected to the membrane so that an inner circumferential edge of the lens shaper defines a central area of the lens and light passing said area is refracted depending on a curvature of said area, and
   an actuator configured to move the lens shaper towards the cover element to adjust said curvature of said area of the membrane and therewith the focal length of the lens, wherein for moving the lens shaper, the actuator comprises at least one deformable member formed out of a shape-memory alloy, wherein said deformable member comprises a first state corresponding to an initial position of the lens shaper and a second state in which the lens shaper is moved towards the cover element to adjust the focal length of the lens, wherein the at least one deformable member comprises an elongated shape and forms a loop,
   wherein the lens shaper comprises four protrusions extending in a radial direction of the lens shaper, and wherein the at least one deformable member comprises four portions, wherein each portion extends over one of the protrusions of the lens shaper.

2. The lens according to claim 1, wherein the actuator is configured to heat the at least one deformable member to bring the at least one deformable member from the first state to the second state.

3. The lens according to claim 1, wherein the at least one deformable member is arranged outside the internal space of the container.

4. The lens according to claim 1, wherein the at least one deformable member is connected to holding elements arranged on an outside of the lateral wall.

5. The lens according to claim 1, wherein in the second state of the at least one deformable member, each portion comprises a reduced curvature compared to the first state of the at least one deformable member, so that the lens shaper is pulled towards the cover element when the at least one deformable member is brought from the first state to the second state.

6. The lens according to claim 1, wherein the membrane is connected to the lateral wall via an annular spacer arranged between the lateral wall and the membrane.

7. The lens according to claim 1, wherein the at least one deformable member and the lens shaper are arranged in the internal space of the container and are immersed in the liquid.

8. The lens according to claim 1, wherein the lateral wall is formed as a printed circuit board.

* * * * *